US007324513B2

(12) United States Patent
Shankar et al.

(10) Patent No.: US 7,324,513 B2
(45) Date of Patent: Jan. 29, 2008

(54) IP MULTICAST PACKET REPLICATION PROCESS FOR 4K VLANS

(75) Inventors: Laxman Shankar, San Jose, CA (US); Anand Anupam, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 1050 days.

(21) Appl. No.: 10/389,922

(22) Filed: Mar. 18, 2003

(65) Prior Publication Data

US 2004/0184454 A1    Sep. 23, 2004

(51) Int. Cl.
*H04L 12/28* (2006.01)
(52) U.S. Cl. ........................................ 370/390; 370/342
(58) Field of Classification Search ............... None
See application file for complete search history.

(56) References Cited

U.S. PATENT DOCUMENTS

| 5,748,905 | A  | * | 5/1998  | Hauser et al. | 709/249   |
|-----------|----|---|---------|---------------|-----------|
| 5,872,783 | A  | * | 2/1999  | Chin          | 370/395.32|
| 5,949,789 | A  | * | 9/1999  | Davis et al.  | 370/452   |
| 5,959,989 | A  | * | 9/1999  | Gleeson et al.| 370/390   |
| 6,216,167 | B1 | * | 4/2001  | Momirov       | 709/238   |
| 6,480,468 | B1 | * | 11/2002 | Kishigami et al. | 370/230.1 |
| 6,661,791 | B1 | * | 12/2003 | Brown         | 370/390   |
| 7,058,053 | B1 | * | 6/2006  | Schober       | 370/390   |
| 2003/0165140 | A1 | * | 9/2003 | Tang et al.   | 370/393   |
| 2003/0174725 | A1 | * | 9/2003 | Shankar       | 370/428   |
| 2003/0198224 | A1 | * | 10/2003 | Lee et al.   | 370/392   |
| 2004/0037279 | A1 | * | 2/2004  | Zelig et al. | 370/390   |

OTHER PUBLICATIONS

"Requirements for Traffic Engineering Over MPLS"; Network Working Group, Request for Comments, Sep. 1999; see http://www.ietf.org/rcf/rcf2702.txt.
"Encapsulation Methods for Transport of Ethernet Frames Over IP and MPLS Networks"; Network Working Group, Internet Draft, Jan. 2003; see http://www.ietf.org/internet-drafts/draft-martini-ethernet-encap-mpls-01.txt.

(Continued)

*Primary Examiner*—Huy D. Vu
*Assistant Examiner*—Phuongchau B Nguyen
(74) *Attorney, Agent, or Firm*—Squire, Sanders & Dempsey, L.L.P.

(57) ABSTRACT

A network device for controlling data flow can have a buffer configured to receive a packet, a first determining unit configured to determine a multicast group number from the packet, a first table storage unit configured to store at least one first bit vector and at least one first pointer, and configured to have the multicast group number indexed thereto, and a second table storage unit configured to store at least one second bit vector and at least one second pointer, and configured to have the at least one first pointer indexed thereto. In addition, the device can have a generating unit configured to generate at least one first network identifier based on the at least one first bit vector and the at least one second bit vector, a replication unit configured to replicate the packet for the at least one first network identifier, and a first forwarding unit configured to forward a replicated packet replicated by the replication unit to a network destination associated with the at least one first network identifier.

18 Claims, 4 Drawing Sheets

OTHER PUBLICATIONS

"Encapsulation Methods for Transport of ATM Cells/Frame Over IP and MPLS Networks"; PWE3 Working Group, Internet Draft, Dec. 2002; see http://www.ietf.org/internet-drafts/draft-martini-atm-encap-mpls-01.txt.

"Encapsulation Methods for Transport of PPP/HDLC Frames Over IP and MPLS Networks"; Network Working Group, Internet Draft, Oct. 2002; see http://www.ietf.org/internet-drafts/draft-martinia-ppp-encap-mpls-00.txt.

* cited by examiner

IP Multicast MSB Table 300

| Index = IPMG# | MS Bit Vector | Head Pointer (HP) |
|---|---|---|
| 0 | 0 1 1 0 0 0 0 0 0 0 0 0 0 0 1 1 0 1 0 1 0 ... 0 1 0 | 0x123 |
| 1 | 1 0 1 0 0 0 0 1 0 0 0 0 0 0 0 1 0 1 0 0 1 ... 0 0 0 | 0xCAB |
| ... | ... | ... |
| n | 0 0 0 0 1 0 1 0 0 0 0 0 0 0 0 1 0 0 0 0 0 ... 0 1 1 | 0x1FG |

IP Multicast LSB Table 305

| Index = HP | LS Bit Vector | Next Pointer |
|---|---|---|
| 0x123 | 1 1 1 0 0 0 0 0 0 0 0 0 0 0 0 1 1 0 0 0 0 0 ... 0 0 1 | 0x124 |
| 0x124 | 0 0 0 0 0 0 0 0 0 0 0 0 0 0 0 0 1 0 0 0 1 0 ... 0 0 0 | 0xXXX |
| ... | ... | ... |
| n | 0 1 0 0 0 0 0 0 0 0 0 0 0 0 0 1 0 0 1 0 0 0 ... 1 1 0 | 0xCAC |

IP MULTICAST PACKET REPLICATION PROCESS FOR 4K VLANS

BACKGROUND OF THE INVENTION

1. Field of the Invention

The present invention relates to a method of and an apparatus for processing the information to forward multicast packets in a communication network environment such as token ring, ATM, Ethernet, Fast Ethernet, Gigabit Ethernet, 10 Gigabit Ethernet or any other networking environment. In particular, the present invention relates to network devices, including switches, routers and bridges, which allow data to be routed and moved in networks, and the method of routing data. The present invention can be implemented in a network component, which may include discrete devices or which may be implemented on a semiconductor substrate such as a silicon chip. The invention may also be integrated in software, or a combination of hardware and software.

2. Description of the Related Art

In networking applications, an incoming packet enters an ingress port of a network component, such as a switch. The network component processes the incoming packet and directs it to an egress port. In processing the incoming packet, the network component can examine the incoming packet on the ingress side, and can determine addressing and routing information to enhance network performance.

As the demands for faster processing speed and lower cost network components increase, so do the demands for an innovative system to meet such demands. Accordingly, there may be a need for an efficient method and means for forwarding multicast data between interconnected network devices, and a need for a method that allows for efficient replication of Internet Protocol (IP) multicast packets.

SUMMARY OF THE INVENTION

One example of the present invention can include a method of controlling data flow in a network device. The method can include the steps of receiving a packet at a network device, determining a multicast group number from the packet, obtaining a first bit vector and a first pointer that correspond to the multicast group number; and obtaining a second bit vector and a second pointer based on the first pointer. In addition, the method can include the steps of generating at least one first network identifier based on the first bit vector and the second bit vector, replicating the packet for the at least one first network identifier, and forwarding a replicated packet to network destination associated with the at least one first network identifier.

In another example, the present invention can relate to a network device for controlling data flow. The device have a buffer configured to receive a packet, a first determining unit configured to determine a multicast group number from the packet received at the buffer, a first table storage unit configured to store at least one first bit vector and at least one first pointer, and configured to have the multicast group number determined by the first determining unit indexed thereto, and a second table storage unit configured to store at least one second bit vector, and configured to have the at least one first pointer from the first table storage unit indexed thereto. In addition, the device can have a generating unit configured to generate at least one first network identifier based on the at least one first bit vector from the first table storage unit and the at least one second bit vector from the second table storage unit, a replication unit configured to replicate the packet for the at least one first network identifier generated by the generating unit, and a first forwarding unit configured to forward a replicated packet replicated by the replication unit to a network destination associated with the at least one first network identifier.

Furthermore, another example of the present invention can provide a system for controlling data flow in a network device. The system can have a receiving means for receiving a packet at a network device, a first determining means for determining a multicast group number from the packet received at the receiving means, a first obtaining means for obtaining a first bit vector and a first pointer that correspond to the multicast group number determined by the first determining means; and a second obtaining means for obtaining a second bit vector based on the first pointer obtained by the first obtaining means. Moreover, the system can have a generating means for generating at least one first network identifier based on the first bit vector and the second bit vector obtained by the first obtaining means and by the second obtaining means, respectively, a replicating means for replicating the packet for the at least one first network identifier generated by the first generating means, and a first forwarding means for forwarding a replicated packet replicated by the replicating means to a network destination associated with the at least one first network identifier.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
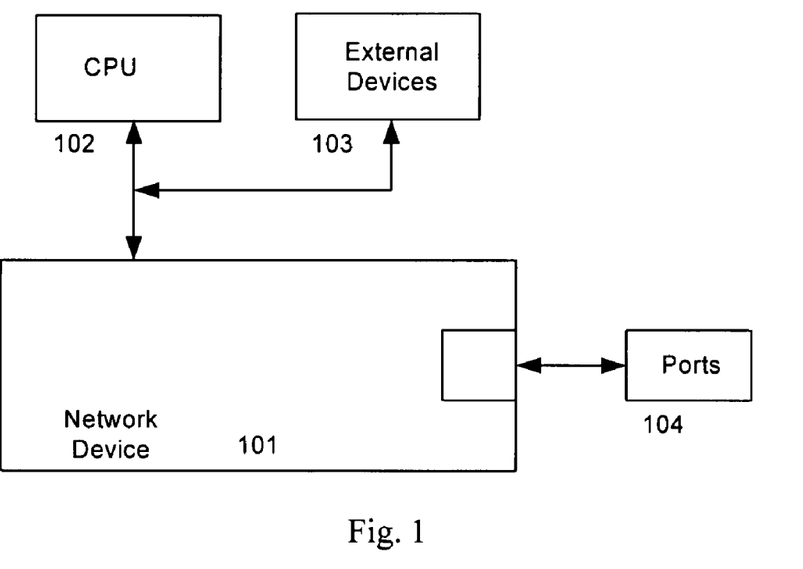
FIG. 1 illustrates one example of a general block diagram of a network device and associated modules, in accordance with the present invention.

FIG. 1 illustrates one example of a configuration of a node within a network, in accordance with the present invention. The network device 101 can be connected to a Central Processing Unit (CPU) 102 and other external devices 103. The CPU can be used to program the network device 101 based on rules that are appropriate to control packet processing. The network device 101 can process data received through physical ports 104 with minimal interactions with the CPU, and can also operate in a free running manner without interactions with the CPU.

Figure 2:
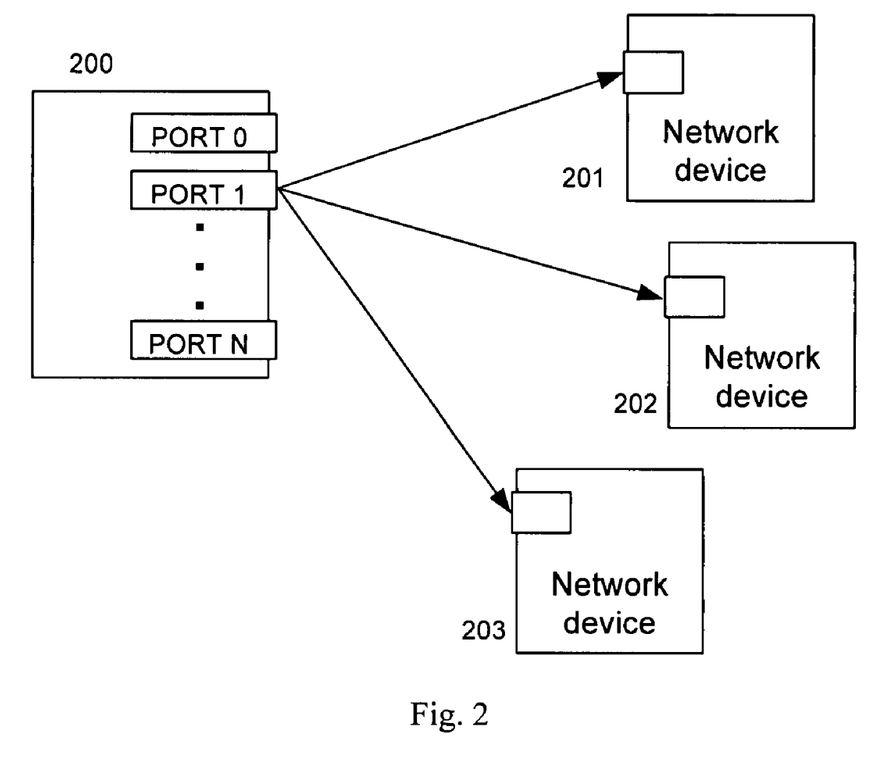
FIG. 2 illustrates one example of a general block diagram of a multicast packet from a switch, in accordance with the present invention.

FIG. 2 illustrates one example of a logical process of forwarding a multicast packet. The initial network device 200 can receive a multicast packet and can process the multicast packet. Such processing can include classifying the packet, modifying the packet and changing the packet forwarding behavior. The processing can also include mirroring the packet to another port, sending the packet to a certain class of service priority queue or changing the type of service. For instance, egress port 1 of FIG. 2 can replicate the packet, and can thereafter forward the packet to one or more of the destination network device(s) 201, 202 and 203. The network devices that receive a copy of the packet are determined by data contained in the packet, as described below.

The packet received can contain information to assist in replicating and forwarding the packet to the destination network devices 201, 202 and 203. Accordingly, a packet received from a source port of a network device can be replicated and forwarded to a plurality of ports that can belong to an IP multicast group. This can be referred to as IP multicast replication. It is noted that the IP multicast group can be a set of ports listed as belonging to a particular IP multicast group member. Thus, IP Multicast replication can be more efficient than general Internet transmissions since the server can forward information containing large amounts of data to multiple recipients simultaneously. Unlike traditional Internet traffic that requires separate connections for each source-destination pair, IP Multicasting can permit a plurality of recipients to share the same source. This means that just one set of packets is transmitted to all the destinations.

The packet can be switched, bridged, forwarded or routed based on the destination IP address. Therefore, when multiple destinations for the packet reside on the same output port, the packet can be replicated as many times as the number of broadcast domains Virtual Local Area Networks (VLANs) that are associated with the output port. A VLAN can be a network of computers that operate as if they are connected to the same wire even though they may actually be physically located on different segments of a local area network. VLANs can be configured through software rather than hardware, which makes them extremely flexible. One advantage of VLANs is that when a computer is physically moved to another location, it can stay on the same VLAN without any hardware reconfiguration.

Figure 3:
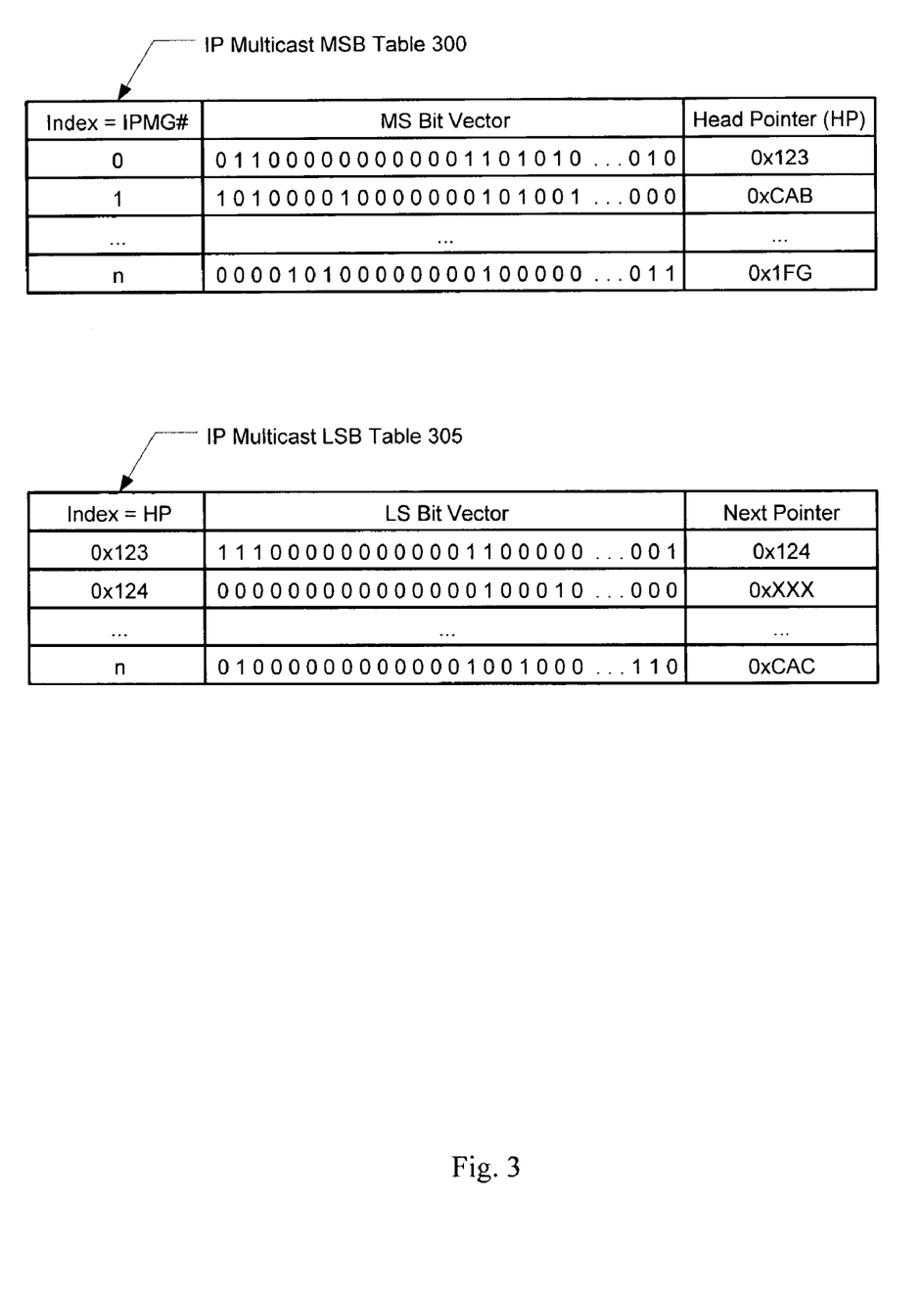
FIG. 3 illustrates one example of the tables for storing the MS bit vectors and the LS bit vectors, in accordance with the present invention.

FIG. 3 shows two storage tables according to the present invention. In particular, FIG. 3 shows one example of an Internet Protocol Multicast Most Significant Bit Table (IP Multicast MSB Table) 300 and an Internet Protocol Multicast Least Significant Bit Table (IP Multicast LSB Table) 305. The one set of IP Multicast MSB Table 300 and the IP Multicast LSB Table 305 can be stored in network device 101 or each set can be stored in each egress Ethernet port, in accordance to the present invention.

The IP Multicast MSB Table 300 can store information such as one or more IP multicast group number(s) (IPMG#), one or more most significant bit vector(s) (MS bit vector), and one or more head pointer(s). The IP Multicast MSB Table 300 can have one or more rows of registers. For instance, the IP Multicast MSB Table 300 can have 256 rows of registers. The IP Multicast MSB Table 300 can store the IPMG#(s) in the first column of registers, can store the MS bit vector(s) in the second column of registers, and can store the head pointer(s) in the third column of registers. In another example, the IP Multicast MSB Table 300 can store the MS bit vector(s) in the first column of the registers, and the head pointer(s) in the second column of the registers. Accordingly, an MS bit vector with a corresponding head pointer can be indexed with an IPMG# whereby an entry position of the IP Multicast MSB Table 300 matching the IPMG# can be obtained.

The registers for storing the IPMG#(s), the MS bit vector(s), and the head pointer(s) can be of any length. The IMPG# can be a value represented in binary or any various other format. The MS bit vector can be a binary vector having 0's and/or 1's, and can be any bit length such as 64 bits in length. Furthermore, the head pointer can be an address value represented in binary, hexadecimal or any other format. The head pointer can be any length such as 12 bits in length.

The IP Multicast LSB Table 305 can store information such as one or more head pointer(s), one or more least significant bit vector(s) (LS bit vector), and one or more next pointer(s). The IP Multicast LSB Table 305 can have one or more rows of registers. For instance, the IP Multicast LSB Table 305 can have 4095 rows of registers. Similar to the storage format of the IP Multicast MSB Table, the IP Multicast LSB Table 305 can store the head pointer(s) in the first column of registers, can store the LS bit vector(s) in the second column of registers, and can store the next pointer(s) in the third column of registers.

The registers for storing the head pointer(s), the LS bit vector(s), and the next pointer(s) can be of any length. The head pointer can be in the same format as the head pointer stored within the IP Multicast MSB Table 300. In other words, the head pointer stored within the IP Multicast LSB Table 305 can be an address value represented in binary, hexadecimal or any other format. The head pointer can be any length such as 12 bits in length. Moreover, the LS bit vector can be a binary vector having 0's and/or 1's, and can be any bit length such as 64 bits in length. Additionally, the next pointer can be an address value represented in binary, hexadecimal or any other format. The next pointer can have the same format as that of the head pointer, and therefore can be of any length such as 12 bits in length.

Figure 4:
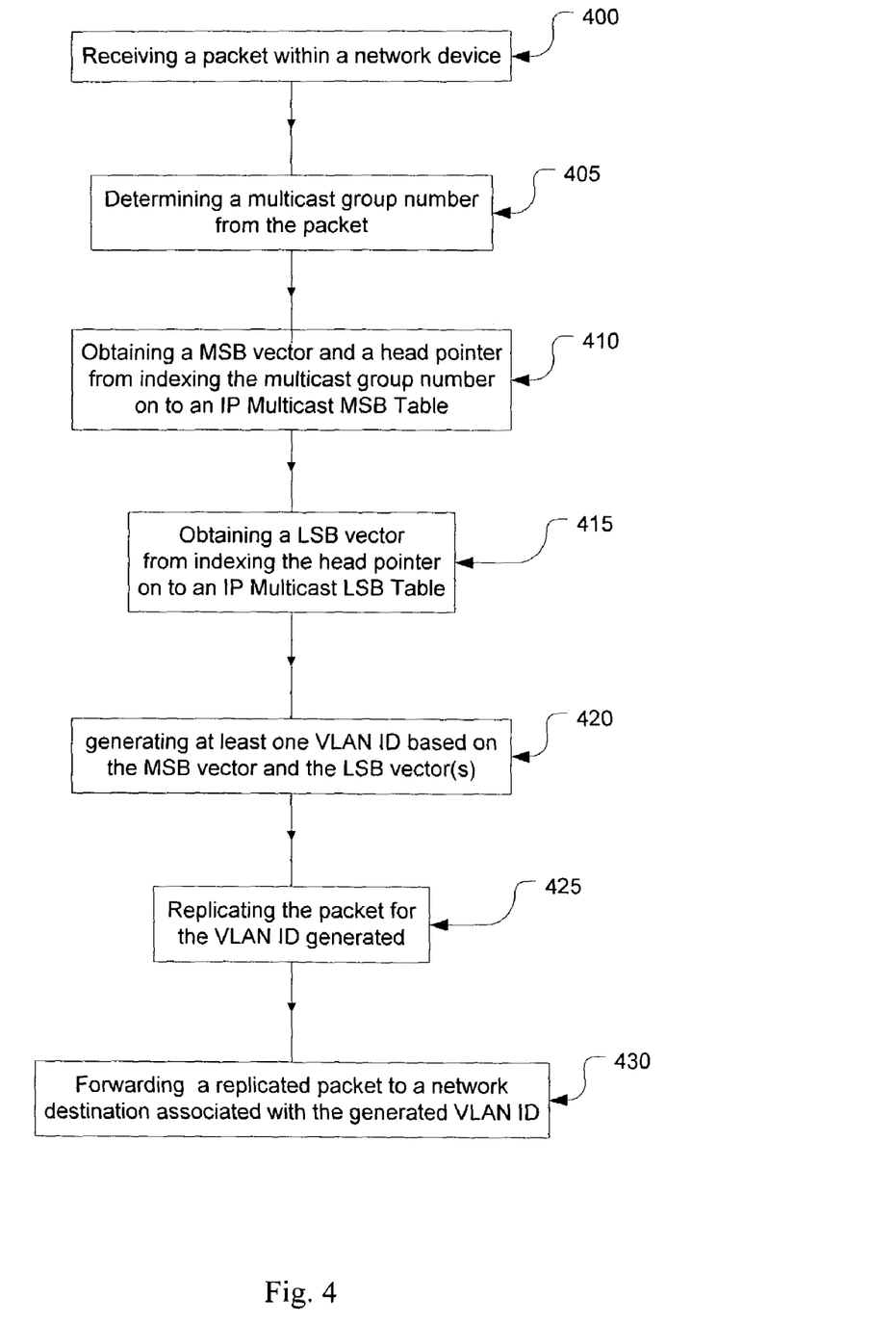
FIG. 4 illustrates a flow chart illustrating one example of a method of controlling data flow in a network device, in accordance to the present invention.

FIG. 4 illustrates one example of a method of controlling data flow in a network device. Specifically, FIG. 4 illustrates one example of a method of utilizing the IP Multicast MSB Table 300 and the IP Multicast LSB Table 305 to replicate a received multicast packet and to forward the replicated packet to the corresponding VLAN. The method of the present example can be implemented in hardware, or software, or a combination of both hardware and software.

A packet can be received within a network device at step 400. The packet can be an IP multicast packet and can arrive at an egress port within the network device. When the packet arrives at the egress port, an IPMG# can be determined from the packet at step 405. In another example, an IPMG# can be determined one level before the packet arrives at the egress port. For instance, the MMU can obtain the packet from the ingress, stores the packet and subsequently forwards it to the egress. Thus, an IPMG# can be determined at the "forwarding logic" of the MMU. Once the IPMG# is determined, the IPMG# can be indexed into a IP Multicast MSB Table such as the one shown in FIG. 3.

After indexing the IPGM# into the IP Multicast MSB Table, a MS bit vector and a head pointer address value can be obtained at step 410. As mentioned above, the MS bit vector can be represented in a binary format having 0's and/or 1's, and can be any length such as 64 bits in length. Each bit position of the MS bit vector having a "1" therein can represent the most signification bits of a VLAN ID. Therefore, if the VLAN ID is 12 bits in length, then each bit position of the MS bit vector indicated by a "1" can represent the most significant 6 bits of the VLAN ID.

For instance, suppose after indexing the IPMG# into the IP Multicast MSB Table, a MS bit vector of "0110000000 . . . 001010" is obtained, and a head pointer address of "0x123" is also obtained. For this example, the MS bit vector is 64 bits in length and the head pointer address is 12 bits in length. Accordingly, in compiling the first part of the VLAN ID, the present invention can determine the most significant 6 bits of the VLAN ID by determining the bit position of the "1" within the MS bit vector going from left to right. Thus, in this example, the first "1" is located in the bit position of hexadecimal 1 or binary "000001". Therefore, the first most significant 6 bits of the VLAN ID is "000001".

Thereafter, the head pointer address corresponding to the MS bit vector obtained from indexing the IPMG# can be indexed into an IP Multicast LSB Table such as the one shown in FIG. 3. The head pointer address can point to a LS bit vector and a next pointer address, and can be obtained at step 415. As mentioned above, the LS bit vector can be represented in a binary format having 0's and/or 1's, and can be any length such as 64 bits in length. Each bit position of the LS bit vector having a "1" therein can also represent the least signification bits of a VLAN ID. Therefore, following the example provide above, if the VLAN ID is 12 bits in length, then each bit position of the LS bit vector indicated by a "1" can represent the least significant 6 bits of the VLAN ID.

Therefore, one or more VLAN ID(s) can be generated based on the information obtained from the MS bit vector, the head pointer address, the LS bit vector, and the next pointer at step 420. Following the example provided above, suppose the head pointer address points to a LS bit vector of "1110000000 . . . 000001" and a next pointer address of "0x124" within the IP Multicast LSB Table. Like the MS bit vector, the LS bit vector is 64 bits in length and the next pointer address is 12 bits in length. Accordingly, in compiling the second part of the VLAN ID, the present invention can determine the least significant 6 bits of the VLAN ID by determining the bit position of the "1" within the LS bit vector going from left to right. Thus, in this example, the first "1" is located in the bit position 0 or binary "000000". Therefore, the least significant 6 bits of the VLAN ID is "000000", and the first VLAN ID compiled is "000001000000".

After the VLAN ID is generated, the present invention can replicate the packet for the generated VLAN ID at step 425. Thereafter, the replicated packet can be forwarded to a network destination associated with the generated VLAN ID at step 430. In other words, the replicated packet can be forward to the particular VLAN having the generated VLAN ID.

In forwarding the replicated packet to the VLAN ID, the present invention can determine the VLAN ID of the received packet. If the VLAN ID of the received packet is the same as or matches the generated VLAN ID, then the replicated packet is L2 forwarded, i.e., forwarded according to Layer 2 values of the packet.

If the VLAN ID of the received packet is not the same as the generated VLAN ID, then the replicated packet is forwarded to the appropriate VLAN. Thereafter, the IP Time-to-Live (TTL) value can be decremented and the IP checksum value can be recalculated. The Source Address (SA) of the replicated packet can be replaced with the IP multicast router Media Access Controller (MAC) address. Furthermore, if the egress port is a tagged port, then the replicated packet can be tagged with the appropriate VLAN ID when it is forwarded thereto. Otherwise, the replicated packet can be forwarded as an untagged packet upon forwarding to the appropriate VLAN.

Once the present invention generates, replicates all the VLAN ID's with respect to the "1's" located within the initial LS bit vector, and forward the replicated packet, the invention can check and determine if there are any additional "1's" located within the MS bit vector. If it is determined that the MS bit vector, obtained by indexing the IPMG#, contains one or more additional "1's" within the MS bit vector, then a next pointer address corresponding to the recently used LS bit vector can be determined and obtained. This next pointer address can thereby point to another LS bit vector within the IP Multicast LSB Table. This LS bit vector can correspond to the next bit position within the MS bit vector that contains a value of "1".

Once the next LS bit vector is obtained, the present invention can thereby compile additional VLAN ID based on the MS bit vector and the next LS bit vector based on the method as discussed above. In other words, the next bit position containing a value of "1" within the MS bit vector can represent the most significant 6 bits of the VLAN ID, and the one or more bit positions having a value of "1" within the next LS bit vector can represent the least significant 6 bits of the VLAN ID. Accordingly, the next set of VLAN ID(s) can be generated, the packet can be replicated for each compiled VLAN ID, and the replicated packets can be forwarded to the VLAN associated with each generated VLAN ID. Once all the bit positions having a value of "1" within the next LS bit vector have been used to compile the VLAN ID, the process discussed above regarding looking to the next bit position within the MS bit vector, determining the next pointer corresponding to the recently used LS bit vector, and obtaining a next LS bit vector based on the next pointer, generating a next set of VLAN ID(s), replicating the packet, and forwarding the replicated packet, etc can be repeated until all the bit positions having a value of "1" within the MS bit vector are processed.

Figure 5:
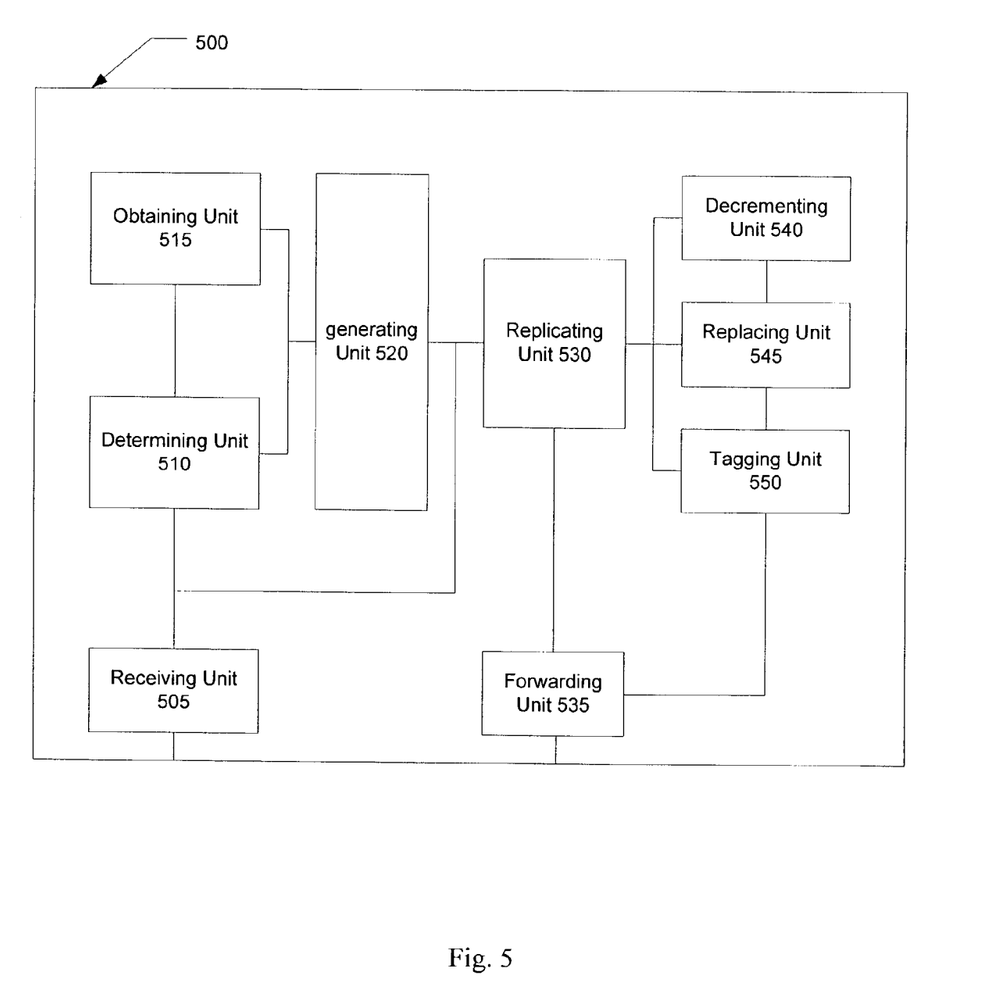
FIG. 5 illustrates one example of a general block diagram of the network device, in accordance with the present invention.

FIG. 5 illustrates one example of a hardware configuration that can control data flow in a network device by replicating and forwarding multicast packets, in accordance with the present invention. In addition, the hardware configuration of FIG. 5 can be in an integrated, modular and single chip solution, and therefore can be embodied on a semiconductor substrate, such as silicon. Alternatively, the hardware configuration of FIG. 5 can be a plurality of discrete components on a circuit board. The configuration can also be implemented as a general purpose device configured to implement the invention with software.

FIG. 5 shows a network device 500. The network device 500 can include a receiving unit 505 and can receive a packet at a network device. In addition, the network device 500 can have a determining unit 510, and an obtaining unit 515. The determining unit 510 can determine an IP multicast group number from the packet, determine a next pointer corresponding to the LS bit vector, and determine a network identifier of the packet, etc. In addition, the obtaining unit 515 can obtain a MS bit vector and a head pointer that correspond to the IP multicast group number, obtain a LS bit vector based on the head pointer, obtain a next LS bit vector based on the next pointer, etc.

Furthermore, the network device 500 can have a generating unit 520 which can be configured to generate one or more VLAN IDs based on the MS bit vector and the LS bit vector, and can be configured to generate one or more VLAN IDs based on the MS bit vector and the next LS bit vector. Additionally, the network device 500 can have a replicating unit 530 and a forwarding unit 535. The replicating unit 530 can replicate the packet for the generated VLAN IDs; and the forwarding unit 535 can forward a replicated packet to the VLANs associated with the VLAN IDs, and can forward the replicated packet to the VLANs corresponding to the VLAN IDs based on Layer 2 values of the packet when the VLAN ID of the packet matches one of the generated VLAN IDs.

FIG. 5 also shows a decrementing unit 540, a replacing unit 545 and a tagging unit 550. The decrementing unit 540 can decrement a time-to-live value and recalculate a checksum value when the replicated packet is forwarded to VLANs associated with the VLAN IDs. The replacing unit 540 can replace a source address in the replicated packet with an multicast router MAC address when the replicated packet is forwarded to the VLANs corresponding to the VLAN IDs. In addition, the tagging unit 550 can tag the replicated packet with the corresponding VLAN ID when a port through which the replicated packet is forwarded is a tagged port.

It is noted that while the term "packet" has been used to describe the present invention, the invention can accommodate various types of network data. Accordingly, for purposes of this invention, the term "packet" can include packet, cell, frame, datagram, bridge protocol data unit packet, packet data, etc.

The above-disclosed configurations of the present invention can be in an integrated, modular, and single chip solution and can be embodied on a semiconductor substrate, such as silicon. Furthermore, the methods of filtering a packet as disclosed herein can be implemented in hardware, or software, or a combination of both hardware and software. Additionally, a person of skill in the art with respect to semiconductor design and manufacturing would be able to implement the various elements and methods of the present invention onto a single semiconductor substrate, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of controlling data flow in a network device, said method comprising the steps of:
   receiving a packet at a network device;
   determining a multicast group number from the packet;
   obtaining a first bit vector and a first pointer that correspond to the multicast group number;
   obtaining a second bit vector based on the first pointer;
   generating at least one first network identifier based on the first bit vector and the second bit vector;
   replicating the packet for the at least one first network identifier; and
   forwarding a replicated packet to a network destination associated with the at least one first network identifier.

2. The method of claim 1, further comprising the step of:
   determining a second pointer corresponding to the second bit vector;
   obtaining a third bit vector based on the second pointer; and
   generating the at least one first network identifier based on the first bit vector and the third bit vector.

3. The method of claim 1, further comprising the steps of:
   determining a second network identifier of the packet; and
   forwarding the replicated packet to the network destination associated with the at least one first network identifier based on Layer 2 values of the packet when the second network identifier matches the any one of the at least one first network identifier.

4. The method of claim 1, further comprising the steps of:
   decrementing a time-to-live value and recalculating a checksum value when the replicated packet is forwarded to the network destination associated with the at least one first network identifier.

5. The method of claim 1, further comprising the step of:
   replacing a source address in the replicated packet with a multicast router MAC address when the replicated packet is forwarded to the at least one first network identifier.

6. The method of claim 1, further comprising the step of:
   tagging the replicated packet with the at least one first network identifier when a port through which the replicated packet is forwarded is a tagged port.

7. A network device for controlling data flow, said device comprising:
   a buffer for receiving a packet;
   a first determining unit for determining a multicast group number from the packet received at the buffer;
   a first table storage unit for storing at least one first bit vector and at least one first pointer, and for having the multicast group number determined by the first determining unit indexed thereto;
   a second table storage unit for storing at least one second bit vector, and for having the at least one first pointer from the first table storage unit indexed thereto;
   a generating unit for generating at least one first network identifier based on the at least one first bit vector from the first table storage unit and the at least one second bit vector from the second table storage unit;
   a replication unit for replicating the packet for the at least one first network identifier generated by the generating unit; and
   a first forwarding unit for forwarding a replicated packet replicated by the replication unit to a network destination associated with the at least one first network identifier.

8. The device of claim 7, wherein the second table storage unit is for storing at least one second pointer corresponding to the at least one second bit vector, and wherein the generating unit is for generating the at least one first network identifier based on the first bit vector and a third bit vector, said third bit vector obtained by the at least one second pointer.

9. The device of claim 7, further comprising:
   a second determining unit for determining a second network identifier of the packet; and
   a second forwarding unit for forwarding the replicated packet to the network destination associated with the at least one first network identifier based on Layer 2 values of the packet when the second network identifier matches the at least one first network identifier.

10. The device of claim 7, further comprising:
    a counter for decrementing a time-to-live value; and
    a calculating unit for recalculating a checksum value when the replicated packet replicated by the replication unit is forwarded to the network destination associated with the at least one first network identifier.

11. The device of claim 7, further comprising:
    a replacing unit for replacing a source address in the replicated packet replicated by the replication unit, with an multicast router MAC address when the replicated packet is forwarded to the network destination associated with the at least one first network identifier.

12. The device of claim 7, further comprising:
a tagging unit for tagging the replicated packet replicated by the replication unit, with the at least one first network identifier when a port through which the replicated packet is forwarded is a tagged port.

13. A system for controlling data flow in a network device, said system comprising:
a receiving means for receiving a packet at a network device;
a first determining means for determining a multicast group number from the packet received at the receiving means;
a first obtaining means for obtaining a first bit vector and a first pointer that correspond to the multicast group number determined by the first determining means;
a second obtaining means for obtaining a second bit vector based on the first pointer obtained by the first obtaining means;
a first generating means for generating at least one first network identifier based on the first bit vector and the second bit vector obtained by the first obtaining means and by the second obtaining means, respectively;
a replicating means for replicating the packet for the at least one first network identifier generated by the first generating means; and
a first forwarding means for forwarding a replicated packet replicated by the replicating means to a network destination associated with the at least one first network identifier.

14. The method of claim 13, further comprising the step of:
a second determining means for determining a second pointer corresponding to the second bit vector;
a third obtaining means for obtaining a third bit vector based on the second pointer obtained from the second determining means; and
a second generating means for generating the at least one first network identifier based on the first bit vector and the third bit vector obtained from the first obtaining means and from the third obtaining means, respectively.

15. The system of claim 13, further comprising:
a second determining means for determining a second network identifier of the packet; and
a second forwarding means for forwarding the replicated packet replicated by the replicating means to the network destination associated with the at least one first network identifier based on Layer 2 values of the packet when the second network identifier matches the at least one first network identifier.

16. The system of claim 13, further comprising:
a decrementing means for decrementing a time-to-live value and recalculating a checksum value when the replicated packet replicated by the replicating means is forwarded to the network destination associated with the at least one first network identifier.

17. The system of claim 13, further comprising:
a replacing means for replacing a source address in the replicated packet replicated by the replicating means, with an multicast router MAC address when the replicated packet is forwarded to the network destination associated with the at least one first network identifier.

18. The system of claim 13, further comprising:
a tagging means for tagging the replicated packet replicated by the replicating means, with the at least one first network identifier when a port through which the replicated packet is forwarded is a tagged port.

* * * * *